Patented June 6, 1939

2,160,915

UNITED STATES PATENT OFFICE 2,160,915

LUBRICANT

William Schreiber, Philadelphia, Pa., assignor to The Atlantic Refining Company, Philadelphia, Pa., a corporation of Pennsylvania No Drawing. Application October 24, 1936, Serial No. 107,367

3 Claims. (Cl. 87—9)

The present invention relates to the art of lubrication, and more particularly to the lubrication of surfaces engaging under extreme pressure, as for example, the rubbing surfaces of hypoid gears, free wheeling transmissions, speed reducers and the like.

The general tendency in the design of modern machinery has been toward a higher ratio between power and "dead weight". This is especially true in the automotive industry, and in recent years certain types of gears and other mechanisms have been developed with the operating pressures on the working surfaces so high that ordinary mineral oil lubricants will not provide sufficient lubrication for satisfactory operation.

Heretofore it has been thought that lubrication consists in maintaining a film of oil between the rubbing surfaces, thereby preventing them from coming into contact with one another and thus preventing wear. That this condition exists in well lubricated bearings is well known, but this conception of lubrication does not apply to highly loaded gears. In well lubricated bearings the loads rarely exceed 2000 lbs. per. sq. in. projected area and the rubbing speeds are generally high enough to maintain a film of oil which separates the rubbing surfaces. In automobile gears, the pressures between gear teeth reach very high values and even the most viscous oils or greases cannot be retained between the surfaces of the teeth in a sufficiently thick film to prevent metal to metal contact, particularly when operating temperatures of 210° F. or higher are commonly encountered.

It has been known that compounded lubricants such as, for example, mineral oils containing fatty oils, fatty acids, metallic soaps, sulfur or combined chlorine, possess lubricating qualities which render them suitable for use under high operating pressures. These compounded oils function satisfactorily under conditions which would cause failure of an unblended mineral oil, if used alone. It is believed that the successful use of such compounded oils depends upon the adsorption and reaction or union of certain components of these oils with the metal surfaces whereby a film of metallic compound, such as, for example, iron sulfide or chloride is formed. It appears that such a film or plating has a low coefficient of friction and that satisfactory operation of heavily loaded bearings or gears depends upon the formation and maintenance of such a film, and not upon the retaining of a film of oil between the bearing surfaces. The hydrocarbon oil constituent of an extreme pressure lubricant serves primarily to remove frictional heat, to wash away any solid particles which may result from wear, and to prevent oxidation of the engaging surfaces.

I have discovered that organic heterocyclic compounds, and more particularly heterocyclic compounds containing one or more elements other than carbon in the ring, when admixed with hydrocarbon oils, are of special utility in the field of extreme pressure lubrication. Among the compounds which may be employed in accordance with my invention are the heterocyclic compounds containing at least one element from the group P, S, Se, Te, Si, As, Sb, Sn, Bi, Cd, Cu, Ni, Fe, Zn, Pb, Hg and Al introduced directly into ring or nucleus. In general, the compounds may be represented by the following formulae:

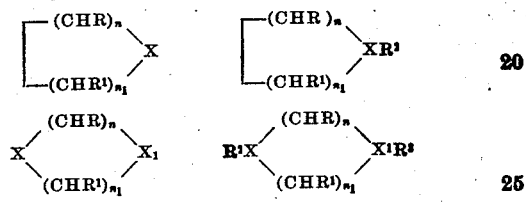

wherein R, R$^1$, R$^2$ and R$^3$ may be alkyl, aryl, alkaryl or heterocyclic groups, hydrogen or halogen; X and X$^1$ are of the group P, S, Se, Te, Si, As, Sb, Sn, Bi, Cd, Cu, Ni, Fe, Zn, Pb, Hg and Al; and $n$ and $n_1$ are at least 1. The groups R, R$^1$, R$^2$ etc. may be represented by methyl-, ethyl-, propyl- and like homologues; phenyl-, cresyl-, naphthyl-, anthracyl- and the like; furyl-, pyridyl-, thienyl- and the like; hydrogen; and halogen such as chlorine, bromine or fluorine.

The heterocyclic compounds of this invention may be further exemplified by the following:

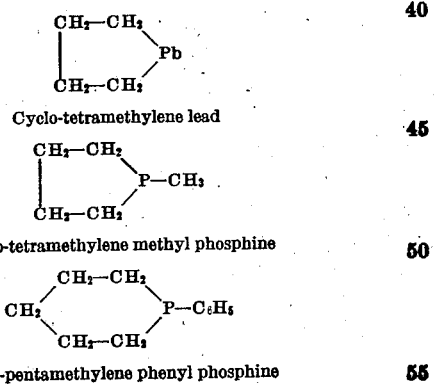

Cyclo-tetramethylene lead

Cyclo-tetramethylene methyl phosphine

Cyclo-pentamethylene phenyl phosphine

Cyclo-pentamethylene mercury:
```
  CH₂—CH₂
 /        \
CH₂        Hg
 \        /
  CH₂—CH₂
```

1,4 thioxane:
```
  CH₂—CH₂
 /        \
O          S
 \        /
  CH₂—CH₂
```

1,4 dithioxane:
```
  CH₂—CH₂
 /        \
S          S
 \        /
  CH₂—CH₂
```

1,4 selenoxane:
```
  CH₂—CH₂
 /        \
O          Se
 \        /
  CH₂—CH₂
```

Ethyl 1,4-phosphoxane:
```
  CH₂—CH₂
 /        \
O          P—C₂H₅
 \        /
  CH₂—CH₂
```

Cyclo-pentamethylene phenyl arsine:
```
  CH₂—CH₂
 /        \
CH₂        As—C₆H₅
 \        /
  CH₂—CH₂
```

Octamethylene mercury-1,6:
```
  CH₂—CH₂—CH₂—CH₂
 /                \
Hg                Hg
 \                /
  CH₂—CH₂—CH₂—CH₂
```

2-chloro, 1,4 thioxane:
```
  CH₂—CHCl
 /        \
O          S
 \        /
  CH₂—CH₂
```

3-phenyl cyclo-tetramethylene zinc:
```
  C₆H₅CH₂—CH₂
 |           \
              Zn
 |           /
  CH₂—CH₂
```

In preparing my lubricant, I add to a suitable mineral oil one or a mixture of two or more of the heterocyclic compounds in quantity sufficient to improve the lubricating value of the oil to the desired extent, depending upon the operating conditions under which the lubricant is to be used. I have found that the quantity of the compound required, in general, does not exceed substantially 10% by weight of my composition. Quantities as small as 3%, or even 1% or less, have been found to improve lubricating oils to a satisfactory extent. In certain instances, 0.1% to 0.2% by weight of the heterocyclic compound was sufficient to improve the lubricating oil to the desired extent. In preparing my lubricant, I may obtain a homogeneous solution or stable suspension of the compound in mineral oil by agitating the mixture at normal or elevated temperatures, or I may dissolve the compound in a suitable solvent and add the resulting solution to the oil, thereafter removing the solvent by vaporization.

The mechanism by which the heterocyclic compounds in lubricating oils function to improve the load-bearing ability and other properties thereof is not entirely understood. It appears, however, that the functioning is dependent upon the adsorption of the compounds upon the metal surfaces of the bearings or other lubricated parts, and the reaction or chemical combination of such compounds with the metal under the influence of localized high temperature and pressure to form a coating or plating having a low coefficient of friction which is resistant to seizure under high operating pressures.

A typical example of my improved lubricant and the method of preparing same is as follows:

0.2 mol of ββ′ dichloroethyl ether, 0.2 mol of phosphenyl chloride $C_6H_5PCl_2$ and 1.15 mols in metallic sodium were refluxed, in ether solution, on a steam bath for about 22 hours. To this reaction mixture was added another 0.8 mol of metallic sodium and the refluxing was continued for an additional 14 hours. The reaction mixture was then cooled and washed twice with 5% aqueous KOH solution and twice with water. The washed mixture was then dried, and the ether diluent and unreacted chloro ether were removed from the product by distillation. Approximately 1% by weight of the reaction product, i. e., the phenyl derivative of 1,4 phosphoxane, was added to a hydrocarbon lubricating oil having a Saybolt universal viscosity of 376 seconds at 100° F. and an A. P. I. gravity of 29.1°, and a homogeneous solution was obtained. Upon testing the lubricant in an Almen extreme pressure lubricant testing machine at 200 R. P. M., a pressure of 22,000 lbs./sq. in. projected bearing area was sustained before seizure of the bearing occurred; whereas the unblended lubricating oil failed at a pressure of 4,000 lbs./sq. in. projected bearing area. The same reaction product, when added to the same lubricating oil in the amount of 0.25% by weight, sustained a pressure of 17,000 lbs./sq. in. projected bearing area.

It will be seen from the above example, that the addition of a heterocyclic compound to a hydrocarbon oil improves the lubricating value of such an oil to a marked degree, and imparts to the oil certain properties which render it suitable for use in the lubrication of surfaces engaging under extreme pressure. Under certain conditions, for example in the lubrication of transmissions or gear drives where elevated temperatures are not normally encountered, it has been found that the halogenated, and particularly the chlorinated heterocyclic compounds are more efficient than the unchlorinated compounds in their ability to improve the load-bearing capacity of the lubricants.

Furthermore, I have found that heterocyclic compounds of the present invention having as substituents long hydrocarbon chains or substituted hydrocarbon chains, are capable of not only improving the load-bearing capacity of hydrocarbon oils but also effect a lowering of the coefficient of friction, or improve the "oiliness" of the lubricant. The heterocyclic compounds containing long chain alkyl radicals such as cetyl, lauryl, dodecyl and oleyl, and the substitution products thereof, are representative examples of this type of materials.

While I have described my invention with reference to the lubrication of gears and bearings operating under heavy loads, I do not intend to limit myself thereto, but, contemplate the use of my lubricant in operations such as the cutting and boring of metals, in which conditions of extreme pressure and temperature are normally encountered, and also in the lubrication of mechanisms operating under moderate pressures, as for example, the crankcase bearings and cylinder walls of internal combustion engines. Furthermore, my compounded oil may be utilized as a base in the preparation of thickened oils, i. e., greases, by the addition thereto of soaps or other conventional thickening agents, in order to obtain lubricants of desired viscosity. My compounded oil may also be blended with fatty oils, fatty acids, synthetic esters and the like, or the heterocyclic compounds, per se, may be admixed with fatty oils, for the lubrication of mechanisms in which the presence of a fatty oil is desirable.

What I claim is:

1. A lubricant comprising hydrocarbon oil and a small amount, sufficient to impart extreme pressure properties to the oil, of a cyclo-polymethylene compound containing a phosphorus atom and an oxygen atom within the ring.

2. A lubricant comprising hydrocarbon oil and a small amount, sufficient to impart extreme pressure properties to the oil, of an aryl substituted phosphoxane.

3. A lubricant comprising hydrocarbon oil and a small amount, sufficient to impart extreme pressure properties to the oil, of phenyl 1,4-phosphoxane.

WILLIAM SCHREIBER.